United States Patent [19]

Langner

[11] Patent Number: 5,733,450
[45] Date of Patent: Mar. 31, 1998

[54] ROTARY SCREENING APPARATUS HAVING A SCREENING CYLINDER CASING

[76] Inventor: Herbert Gunther Joachim Langner, 3446 Bristol Drive, Burlingtn, Ontario, Canada, L7M 1Z1

[21] Appl. No.: 547,195

[22] Filed: Oct. 24, 1995

[30] Foreign Application Priority Data

Sep. 29, 1995 [CA] Canada ................. 2159567

[51] Int. Cl.⁶ ..................... B01D 33/067
[52] U.S. Cl. ............... 210/403; 210/380.3; 210/402; 209/270; 209/288; 209/407
[58] Field of Search .................. 210/402, 403, 210/404, 359, 380.3; 209/407, 270, 288

[56] References Cited

U.S. PATENT DOCUMENTS

| | | | |
|---|---|---|---|
| 2,734,635 | 2/1956 | Holzenthal | 210/396 |
| 4,737,277 | 4/1988 | Lenac | 210/402 |
| 5,008,019 | 4/1991 | Langner | 210/404 |
| 5,607,587 | 3/1997 | Langner | 210/380.3 |

*Primary Examiner*—David A. Reifsnyder
*Attorney, Agent, or Firm*—Riches, McKenzie & Herbert

[57] ABSTRACT

A rotary screening device is disclosed which includes a rotating cylinder having an inlet end, an outlet end and a cylindrical wall formed at least partly from the screening surface. The cylinder is rotatably supported on wheels which are in turn mounted within a trough-shaped spray shield having sides formed from a single unitary blank of metal, and which extends about the lower radial surfaces of the cylinder wall, functioning as the screening device frame.

21 Claims, 5 Drawing Sheets

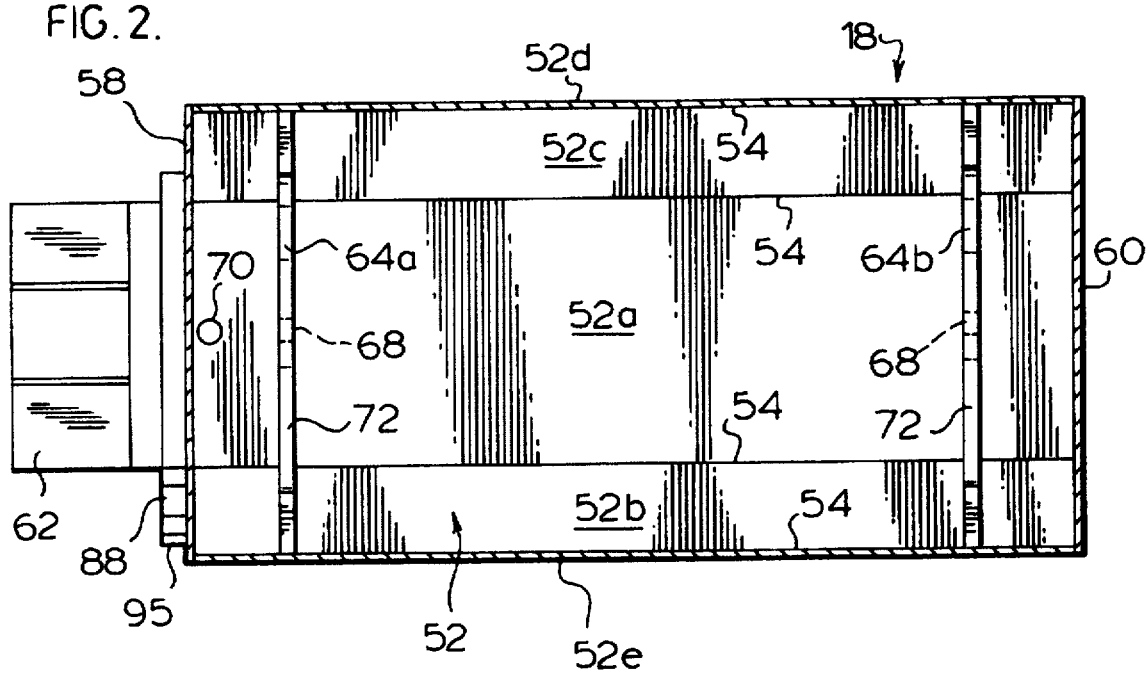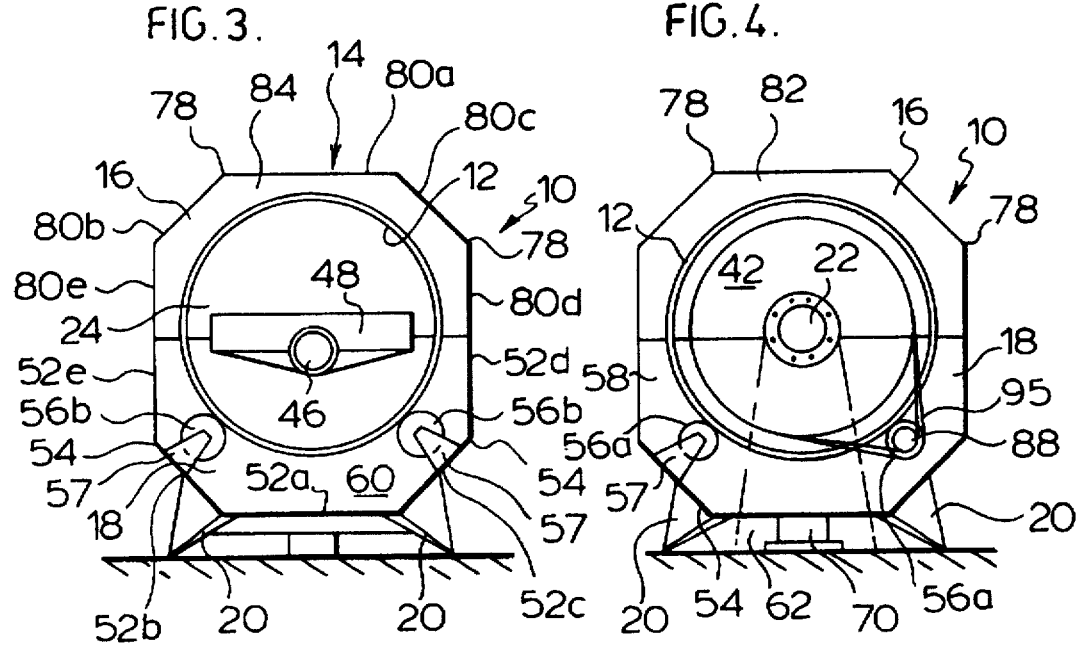

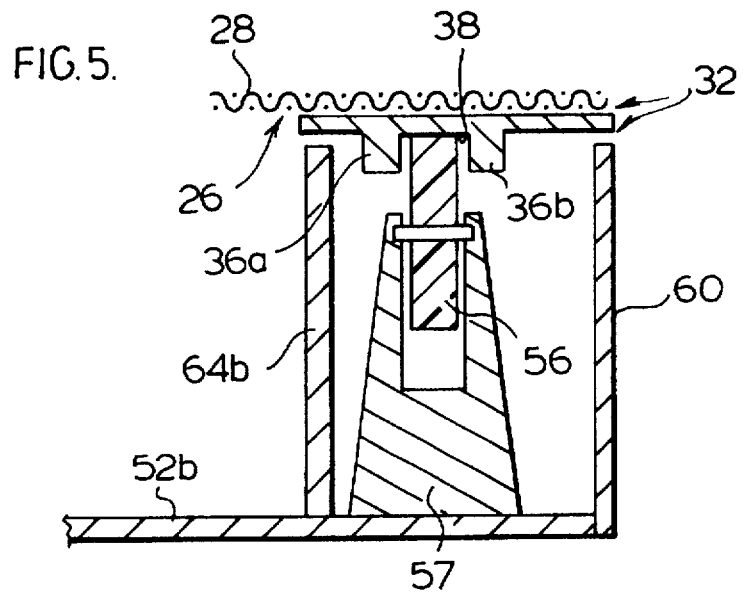
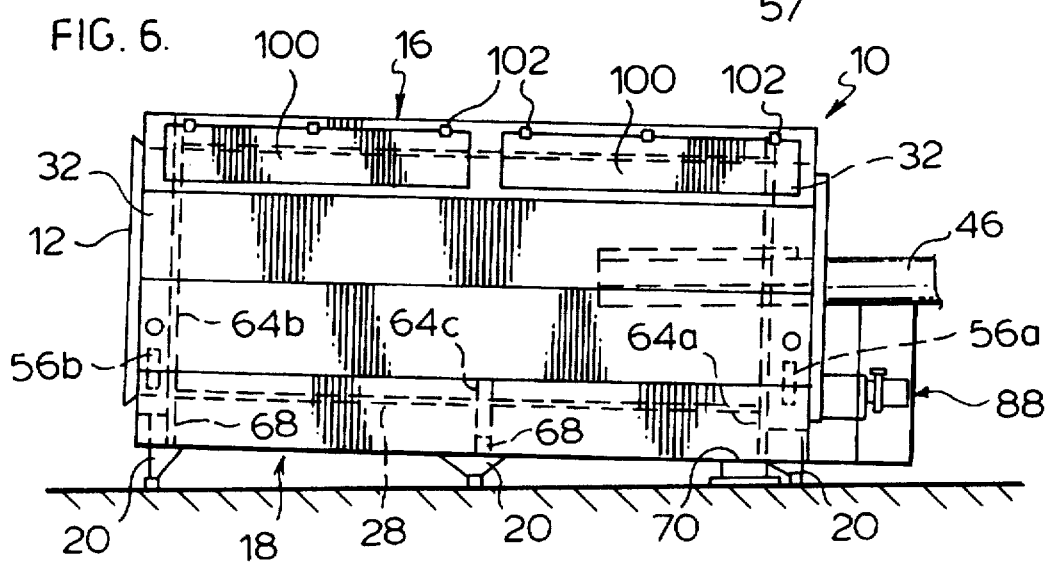
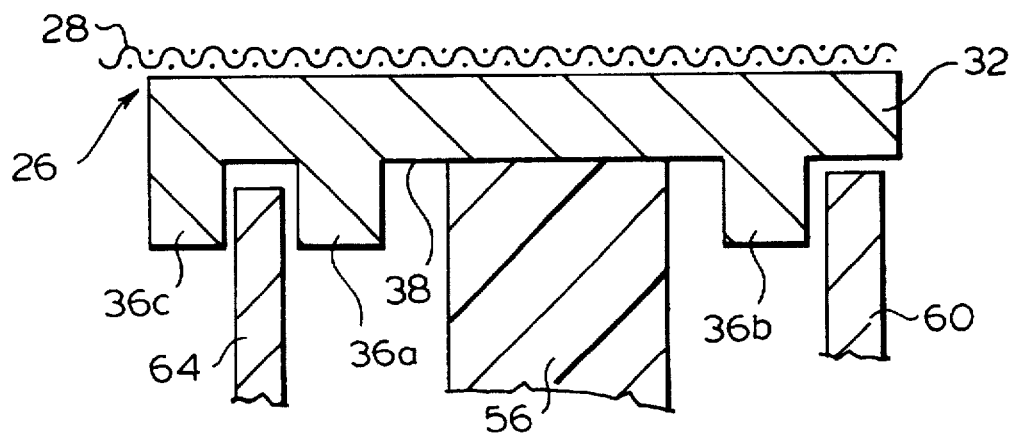

ROTARY SCREENING APPARATUS HAVING A SCREENING CYLINDER CASING

SCOPE OF THE INVENTION

This invention is directed to a rotary screening apparatus for separating solids from filtrate in an influent stream, and more particularly, to a screening apparatus having a rotating screening cylinder and an external casing which functions to both contain filtrate which passes through the screening cylinder and as the frame upon which the screening cylinder is supported.

BACKGROUND OF THE INVENTION

Various screening apparatus which incorporate rotating screens are well known for use in increasing the solid content of municipal sewage, sludge treatment, and food processing. Conventional screening devices typically incorporate a hollow screening cylinder rotatably mounted on metal supporting wheels or a roller mechanism and which is journalled for rotation about its horizontally oriented axis. Influent to be screened is fed into the interior of the rotating cylinder and on to the screening surface. Filtrate from the influent then passes under gravity through openings in the screening surface, leaving behind solids which are too large to pass through the screens. The retained solids thereafter are moved along the interior of the cylinder and outwardly therefrom through an outlet end or opening.

Conventional screening devices suffer the disadvantage in that in their use, the rotational movement of the screen often sprays and disburses filtrate from the influent over a wide area. This is particularly undesirable where the screening apparatus is used to treat sewage or other hazardous wastes, where the filtrate spray may present a health hazard or produce unpleasant odours. In addition, influent filtrate frequently has an alkaline or acidic pH level, and on contact with the supporting mechanism, often leads to the premature corrosion and failure of the apparatus.

A further difficulty with conventional screening apparatus exists in that during operation, the apparatus produce comparably high noise levels as a result of the movement of the contained portions of influent along the interior of the rotating screening cylinder, and the associated vibrational movement of the cylinder over the metal supporting wheels.

To overcome noise and spray problems associated with conventional rotating screening apparatus, several manufacturers have developed various covers or spray shields which enclose the radial sides of the cylindrical screen as it rotates. Heretofore, such covers have been provided as an option which was added over an existing conventional apparatus. Conventional covers typically include an open bottom and/ or are assembled in place by bolting or welding various cover pieces to the existing supporting frame for the screening cylinder. A disadvantage with such conventional covers has been that they are poorly suited for use in most screening operations. In particular, over time, the repeated vibrations produced by the rotating screen tends to loosen bolts resulting in portions of the cover vibrating or even breaking loose. The vibration and failure of the components increases the operational noise of the apparatus and necessitates increased maintenance and down time.

It has also been considered to provide the screening apparatus with rubber supporting wheels to reduce noise produced by metal-on-metal contact. Non-metal supporting wheels suffer the disadvantage that they wear much more quickly than metal supporting wheels, with the result that the wheels must be replaced, thereby necessitating the removal of the screening cylinder from the apparatus.

SUMMARY OF THE INVENTION

Accordingly, to at least partially overcome the disadvantages of previously known devices, the present invention provides a rotary screening apparatus in which the screening cylinder is housed within an upwardly open trough having its sides formed substantially from a single blank of metal and which functions both as the supporting frame for the cylinder and as a spray shield.

Another object of the invention is to provide a rotary screening apparatus in which a casing is provided about the radial side surfaces of the screening cylinder to contain any spray from filtrate passing therethrough.

Another object of the invention is to provide a rotating screening apparatus having an exterior casing which is formed from as few separate components as possible.

A further object of the invention is to provide a casing for a rotating cylindrical screen having enhanced structural integrity and increased resistance to vibrational forces.

Another object of the invention is to provide a rotary screening apparatus in which a frame is provided which substantially isolates the cylinder supporting wheels and/or roller mechanism from the influent filtrate.

A further object of the invention is to provide a rotary screening apparatus in which the wheels which support the screening cylinder may be easily removed and replaced, without the requirement of removing the screening cylinder.

The present apparatus includes a rotating cylinder which is formed having an inlet end, an outlet end and, depending on the material to be screened, cylindrical wall formed at least partly from a screening surface. The screening surface may, for example, be a woven wire mesh screen, a wedge wire screen, or any other conventional screen. The cylinder is rotatably supported on wheels or another such roller mechanism which are in turn mounted to the screening device frame. The cylinder is journalled for rotation about its central longitudinal axis, which may be either in a horizontal position or a position inclined with the axis oriented at up to 45° from horizontal towards either the inlet or outlet end.

The inventor has appreciated an improved rotary screening device wherein the rotating cylindrical screen is rotatably mounted within a trough-shaped spray shield which functions as the frame for the screening device and extends about the lower radial surfaces of the cylindrical wall. To avoid the difficulties associated with multi-part covers, the sidewalls of the spray shield are preferably formed from a unitary sheet of steel or several sheets of steel welded together either before or after bending to form integral sidewalls. Preferably, the spray shield extends lengthwise along the entire the length of the screening cylinder, and upwardly across approximately half of the circumferal surface of the cylinder wall.

The applicant has appreciated that the apparatus may be provided with a configuration in which the spray shield is provided as part of a casing which also includes a top cover sized to be secured over the spray shield and screening cylinder, so as to completely encircle the cylinder about the circumferential of the cylinder wall surface. The top cover may be bolted in place or removably or hingely coupled to the spray shield to permit access to the screening cylinder for cleaning and other maintenance functions.

Preferably, a series of webs are provided along the interior of the casing with webs located in the spray shield acting as bulkheads to provide increased strength; and aligned pairs of upper and lower webs extending inwardly towards the cylinder from the spray shield and the top cover respectively.

The webs are spaced along the casing and extend towards the cylindrical wall a distance selected to substantially block filtrate and spray from moving therebetween. By locating the supporting wheels or roller mechanism on the spray shield at positions so that the upper and lower webs are positioned between the screening surfaces and the supporting wheels, filtrate and spray may be substantially prevented from contacting and prematurely corroding the supporting wheels or the like. If desired, the webs may be provided as part of a bulk-head welded to the sides of the respective spray shield or cover to provide the casing with increased overall strength.

To further reduce filtrate spray, the inlet end of the screening cylinder may be covered by an end plate or end cover which is formed as an annular rim defining a circular inlet opening centered on the axis therethrough. The inlet end cover may be provided in a mated engagement with a bulk-head or an end wall of the spray shield so as to substantially prevent the movement of filtrate therebetween.

Accordingly, in one aspect the present invention resides in a rotary screening apparatus for increasing the solid content of influent, said apparatus comprising, a hollow cylinder having a central longitudinal axis oriented at approximately 0° to 45° from horizontal, the cylinder being journalled for rotation about the axis and including an inlet end, an outlet end, and a generally cylindrical wall comprising a screening surface, conveying means for delivering said influent into the interior of the cylinder via said inlet end, roller means for rotatably supporting said cylinder, rotation means for rotating said cylinder about the axis, casing means for housing said cylinder, the casing means including lower shield means for containing filtrate from said influent which passes downwardly through said cylindrical wall, the shield means including lower sidewall means extending from said inlet end to said outlet end, the lower sidewall means comprising a lower pan member spaced below said cylinder and edge sidewall portions extending upwardly from opposite sides of the pan member about a portion of said cylinder wall, said pan member and sidewall portions being integrally formed.

In another aspect, the present invention resides in a rotary screening apparatus for increasing the solid content of influent, said apparatus comprising, a hollow cylinder having a central axis oriented at approximately 0° to 10° from horizontal, the cylinder being journalled for rotation about said axis and including an inlet end, an outlet end and a cylindrical wall comprising a screening surface and a generally cylindrical end frame member spaced towards each of an associated one of said inlet end and said outlet end, a plurality of roller means for engaging each said end frame members to rotatably support said cylinder, conveying means for delivering said influent into the interior of said cylinder via the inlet end, casing means for housing the cylinder, the casing means including shield means for containing filtrate from said influent which passes through said cylindrical wall, the shield means including sidewall means extending substantially from said inlet end to said outlet end, and first and second bulkhead means for reinforcing said sidewall means, the sidewall means comprising an integral sheet of metal extending about a lower portion of said cylindrical wall, each of said first and second bulkhead means being secured to said sidewall means towards said inlet end and said outlet end and extending towards an associated end frame member so as to restrict movement of said filtrate therebetween.

In a further aspect, the present invention resides in a rotary screening apparatus for increasing the solid content of influent, said apparatus comprising, a hollow cylinder having a central axis oriented at approximately 0° to 10° horizontally, the cylinder being journalled for rotation about said axis and including an inlet end, an outlet end and a cylindrical wall comprising a screening surface and a generally cylindrical end frame member spaced towards each of an associated one of said inlet end and said outlet end, a plurality of roller means for engaging each said end frame members to rotatably support said cylinder, conveying means for delivering said influent into the interior of said cylinder via the inlet end, casing means for housing the cylinder, the casing means including shield means for containing filtrate from said influent which passes through said cylindrical wall, the shield means including sidewall means extending substantially from said inlet end to said outlet end, bulkhead means coupled to said sidewall means for reinforcing said casing, and end wall means secured at each end of the sidewall means, the sidewall means comprising a lower pan member spaced below said cylinder and edge sidewall portions extending upwardly from opposite sides of the pan member about a portion of said cylinder wall, said roller means being secured to said sidewall portions of said pan members.

BRIEF DESCRIPTION OF THE DRAWINGS

Further aspects and advantages of the present invention will appear from the following description, together with the accompanying drawings in which:

FIG. 2 is a top schematic view of the spray shield for use with the device of FIG. 1 with the top cover, cylinder and roller mechanism removed;

FIG. 3 is a schematic view of the outlet end of the rotary screening device shown in FIG. 1;

FIG. 4 is a schematic view of the inlet end of the screening device shown in FIG. 1;

FIG. 5 shows a partial sectional view of a supporting wheel of the screening device of FIG. 1 taken along line 5—5;

FIG. 6 schematically illustrates a rotary screening device in accordance with a second embodiment of the invention;

FIG. 7 shows a partial sectional view of the screening device of FIG. 5 in which an end frame member in accordance with a third embodiment of the invention is used;

DETAILED DESCRIPTION OF THE DRAWINGS

Figure 1:
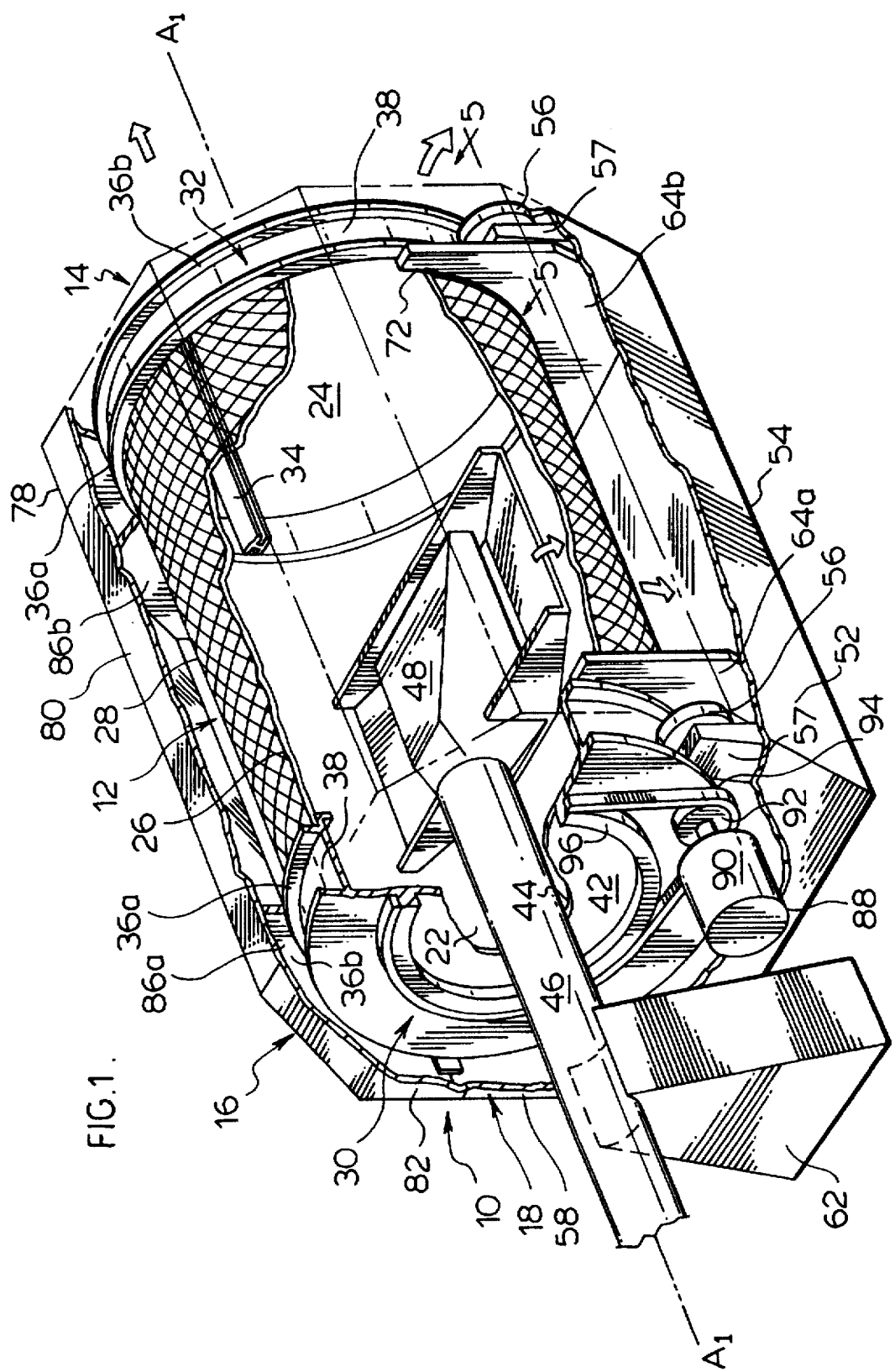
FIG. 1 is a partially cut-away perspective view of a rotary screening device in accordance with a first embodiment of the invention.

Reference is made first to FIG. 1 which shows a pictorial view of a rotary screening device 10 for treating a wood pulp influent slurry in accordance with a preferred embodiment of the present invention. The device 10 includes a hollow cylinder 12 which is used to separate solids and filtrate from the wood pulp slurry, and a casing 14 which includes a top cover 16 and a lower spray shield 18 mounted on four legs 20.

The cylinder 12 includes an inlet end 22 through which the influent of untreated wood pulp slurry enters the interior of the cylinder 12, outlet end 24 through which treated wood pulp moves outwardly from the cylinder 12 and a cylinder wall 26 which is used to screen solid portions in the influent slurry from filtrate.

FIG. 1 shows best the cylinder wall 26 as being formed substantially in its entirety from a steel woven wire mesh screen 28. Structural support for the wire mesh screen 28 is provided by cylindrical end frame members 30,32 positioned adjacent to each of the respective inlet and outlet ends 22,24; as well as cross-frame members 34 which join the end frame members 30,32 on radially opposite sides of the cylinder 12. The end frame members 30,32 and cross-frame members 34 are formed from solid steel having a gauge which is selected to provide the necessary structural integrity to the cylinder 12 to achieve the intended use of the device 10. Each of the end frame members 30,32 have the substantially identical construction, and as seen best in FIG. 5 are formed having a generally U-shaped cross-section, including a pair of spaced flanges 36a,36b extending radially outwardly from the peripheral edges of an annular, radially outwardly facing central shoulder member or track 38. It is to be appreciated that while FIG. 1 illustrates the cylinder 12 as having two end frame members 30,32 and two cross-frame members 34, where larger diameter and/or larger screening cylinders are to be used, additional middle frame members and/or cross-frame members are to be provided.

A solid steel inlet end cover plate 42 is welded over the end of frame member 30. The cover plate 42 extends as an annular rim from a peripheral edge of the end frame member 30 radially inwardly, part way towards the cylinder axis $A_1$, and defines a circular inlet opening 44 into the cylinder 12 which is centered on the axis $A_1$. The cover plate 42 acts to substantially prevent influent movement outwardly from the cylinder 12 between the end frame member 30 and the inlet opening 44.

Influent is supplied into the cylinder 12 by an inlet influent pipe 46, which as shown in FIG. 1, extends into the interior of the cylinder 12 through the inlet opening 44. A dispersion tray 48 is coupled to the end of the influent pipe 46 within the cylinder 12 to assist in evenly dispersing influent over the surface of the mesh screen 28.

As shown best in FIGS. 3 and 4, the cover 16 and spray shield 18 have a size selected relative to the cylinder 12 so that the cylinder wall 26 is completely encircled by the casing 14 when the top cover 30 is positioned over the spray shield 18.

Figure 8:
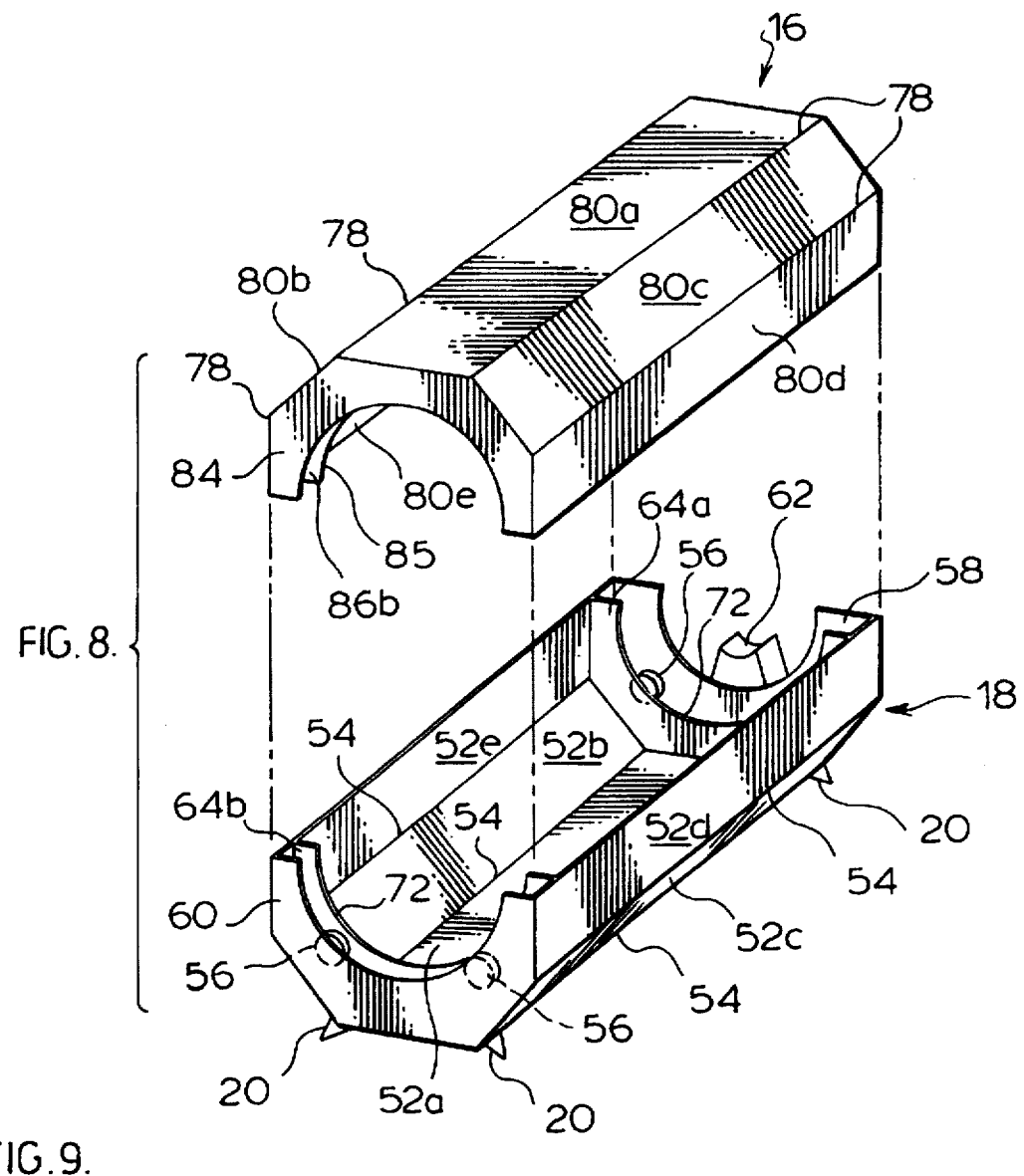
FIG. 8 shows an exploded perspective view of the spray shield and top cover shown in FIG. 1 with the screening cylinder removed.

The lower spray shield 18 is shown best in FIGS. 2 and 8 including sidewalls 52 which are formed from two rectangular sheets of bent 3/16" to 1/4" thick stainless or structural steel which are welded together to form each half of a generally U-shape. The welded integral construction of the sidewalls 52 and thickness of the steel advantageously permit the spray shield 18 to also function as the frame upon which the cylinder 12 is supported.

In the embodiment shown, the integral sidewalls of the spray shield 18 are bent along four parallel fold lines 54 to define a rectangular bottom pan or sidewall portion 52a; two angularly projecting rectangular sidewall portions 52b,52c extending from each side of the pan 52a; and two vertically extending rectangular sidewall portions 52d,52e extending upwardly from a respective sidewall portion 52b,52c.

Additional rigidity is provided by steel end walls 58,60 spaced towards the respective inlet end 22 and outlet end 24 of the cylinder which are welded in place over the ends of the sidewalls 52. As seen best in FIGS. 3 and 4, each end wall 58,60 extends radially inwardly towards the cylinder axis $A_1$ with the end wall 60 ending at a radial edge of the cylinder 12. A header-box 62 is welded to and carried by the end wall 58 in a cantilever arrangement. The header-box 62 extends upwardly from the bottom of the spray shield 18 towards the axis $A_1$ to support the influent pipe 46 in a position extending into the interior of the cylinder 12.

FIG. 2 shows best the spray shield 18 as further including two inner bulkheads 64a,64b spaced towards each respective end wall 58,60 and an adjacent pair of support wheels 56a,56b. Each bulkhead 64 provides additional structural integrity to the casing and is formed as a web of 14-gauge steel which is welded along its lowermost edge across the sidewall portions 52a,b,c,d,e. Each of the bulkheads 64a,64b extend inwardly towards the cylinder axis $A_1$ to a position immediately adjacent the radial surface of the cylinder wall 26. A filtrate drain hole 68 is provided in the center of each bulkhead 46a,46b along the surface of the bottom sidewall portion 52a. The drain holes 68 allow a filtrate to move along the surface of the sidewall portion 52a past the bulkheads 64a,64b to a main drain 70 provided through the pan sidewall portion 52a adjacent the inlet end 16 of the cylinder 12.

Four metal or rubber wheels 56 are each rotatably mounted on a steel support 57 which are welded at spaced locations along each sidewall portion 52b,52c. The wheels 56 and supports 57 are spaced so that axially spaced opposing pairs of wheels 56a,56b engage the shoulder member 38 of each respective end frame member 30,32 when the cylinder 12 is positioned within the casing 14.

The bulkhead 64a which is closest to the end wall 58 and inlet end 22 is located immediately adjacent the end frame member 30 so that the pair of wheels 56a adjacent the inlet end 22 are positioned between the end wall 58 and bulkhead 64a. The bulkhead 56b which is closest to the end wall 60 and outlet end 24 is located immediately adjacent the end frame member 32 so that the pair of wheels 56b adjacent the outlet end 24 are positioned between the end wall 60 and bulkhead 64b. The bulkheads 64a,64b each extend from the sidewall 52 to a rounded upper surface 72 having a radial curvature which is substantially the same as the radial curvature of the cylinder 26. With this construction, when the cylinder 12 is inserted within the spray shield 18, the rounded surface 72 of each bulkhead 64a,64b locates beside an innermost flange 36a in the manner shown in FIG. 5, to substantially prevent the movement of filtrate and filtrate spray therebetween.

The cylinder 12 is positioned in the spray shield 18 between the end walls 58,60. The cylinder 12 is oriented with its central axis $A_1$ inclining upwardly from the inlet end 22 towards the outlet end 24 at approximately 4° from horizontal by adjusting the height of the supporting legs 20 positioned on the underside of the casing 14 to provide the desired inclination. The cylinder 12 is journalled for rotation about its axis $A_1$, resting on the four wheels 56 with each pair of wheels 56a,56b spaced to engage the shoulder member 38 of each respective end frame members 30,32. By forming the surface of each end frame member 30,32 as a U-shaped track, the radially extending flanges 36a,36b assist in maintaining the cylinder in the correct position on the wheels 56.

The top cover 16, like the spray shield 18, is formed from steel and is removably secured to the shield 18 by bolts (not shown) or the like. It is not required that the cover 16 have the same structural integrity as the bottom shield 18 and a lighter gauge of steel such as 12 to 14 gauge may be used. The top cover 16 is formed by welding two sheets of bent steel to form a generally U-shape essentially the same as that of the spray shield 18. In this construction, the sidewalls of the cover 16 are bent along four parallel fold lines 78 to define cover sidewall portions 80a,80b,80c,80d,80e, each in the mirror position to sidewall portions 52a,52b,52c,52d,52e respectively. The cover 16 also includes end walls 82,84 adjacent the respective inlet and outlet ends 22,24 of the cylinder 12 and which extend towards the axis $A_1$ to the cylinder wall 26.

Upper bulkheads 86a,86b which align directly over the lower bulkheads 64a,64b when the cover 16 is closed are provided across the sidewall portions 80a–80e. The bulkheads 86a,86b have the same construction as the lower bulkheads 64a,64b and extend downwardly from the cover 16 to a rounded lower surface 85 having the same curvature as the radial surface of the cylinder wall 26. When the cover is closed, each aligned pair of bulkheads 64a,86a and 64b,86b are therefore spaced adjacent to the respective flanges 36a to form a substantially fluid tight seal against the cylinder 12. In this arrangement, filtrate and spray may be kept from moving past the bulkheads where it may otherwise contact the supporting wheels 56.

It is to be further appreciated that by mounting the wheel supports 57 on the inclined sidewall portions 52b,52c, the wheels 56 are effectively kept above any filtrate which moves along the bottom pan or sidewall portion 52a. This construction therefore advantageously minimizes the likelihood that the roller mechanism will prematurely corrode as a result of contact with filtrate and filtrate spray.

The cylinder 12 is driven in rotation by a chain drive unit 88. The chain drive unit 88 includes a drive motor 90 which carries a drive sprocket 92, a drive chain 92 and a driven sprocket 94 which is welded to the cover plate 42. The drive sprocket 92 engages the drive chain 22 which passes about the driven sprocket 94. The drive motor 90 rotates the cylinder 12 about its axis $A_1$ with the wheels 56 engaging the U-shape tracks of the respective end frame members 30,32. As seen best in FIG. 4, the chain drive unit 88 is preferably housed within a steel cover housing 95 secured to the end wall 58.

It is to be appreciated that providing a casing 14 which encircles the wall 26 of the cylinder 12 is highly preferable in that it contains and directs filtrate for collection via the main drain 70. The casing 14 further acts to advantageously reduce noise during the use of the device 10.

In operation, an influent wood pulp slurry is directed into the interior of the cylinder 12 and on to the screen 28. The influent slurry is conveyed along the influent pipe 46 by a pump or screw feed (not shown). It is to be appreciated, however, that where the influent slurry has a higher solid content, a conveyor belt, hopper or other supply mechanism may equally be used.

As the slurry is pumped into the cylinder 12, on first contacting the mesh screen 28, filtrate from the slurry passes downwardly through the screen 28 under gravity, and material which is to be collected and which is too large to pass through the openings in the screens 28 is retained within the cylinder 12. As the filtrate moves downwardly through the screen 28, it is collected on the bottom sidewall portion 52a. The slope of the device 10 and sidewall portion 52a permits the filtrate to move towards the main drain 70 via the drain holes 68 provided in each of the bulkheads 64a,64b. As the cylinder 12 is rotated, the material retained in the cylinder 12 is moved outwardly towards the open outlet end 24 of the device 10.

During operation, the slurry is continuously pumped into the cylinder 12 and onto the screen 28. A collection hopper (not shown) positioned below the outlet end 24 collects the retained solid portions for further processing.

Although not essential, diverter vanes or flights (not shown) may also be provided about the interior of the cylinder wall 26 to further direct retained portions of the material outwardly through the outlet end 24.

While FIG. 1 shows a screening device 10 having a trough shaped spray shield 18 with two bulkheads 64a,64b and a cover 16 with bulkheads 86a,86b, other configurations are also possible. FIG. 6 shows a larger rotating cylinder 12 having additional bulkheads and legs wherein like reference numerals are used to identify like components. In FIG. 6, the cover 16 is shown as having a two-part construction bolted over trough shaped spray shield 16. The cover 16 further includes access panels 100a,100b which are attached by hinges 102 and may be opened to permit service access into the interior of the casing 14.

FIG. 5 shows one possible rotary seal-type engagement between the casing bulkheads and the cylinder end frame members, however, it is to be appreciated that other configurations are also possible and will now become apparent. FIG. 7 shows a modified end frame member 30 and bulkhead assembly wherein like reference numerals are used to identify like components. The end frame member 30 shown in FIG. 7 is identical to that in FIG. 5 with the exception that an additional radially extending flange 36c is provided. In FIG. 7, the rounded upper surface 72 of the bulkhead 64 extends from the casing to a position between flanges 36b,36c to form a more complete rotary seal.

Figure 9:
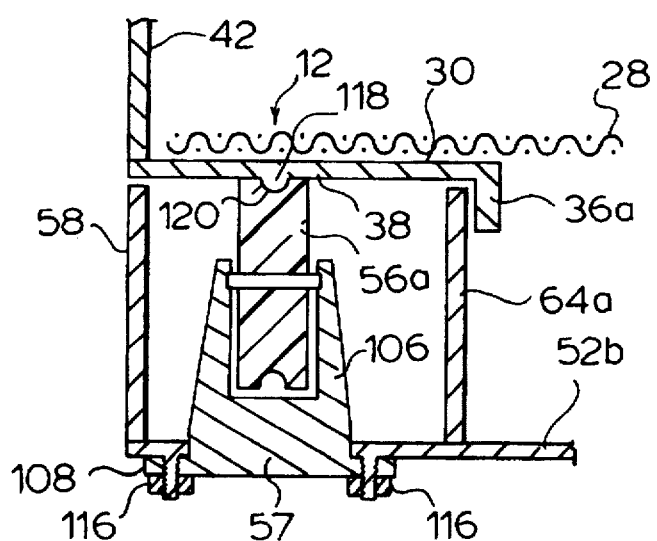
FIG. 9 shows a partial sectional view of a supporting wheel for use in a screening device in accordance with a fourth embodiment of the invention.
Figure 10:
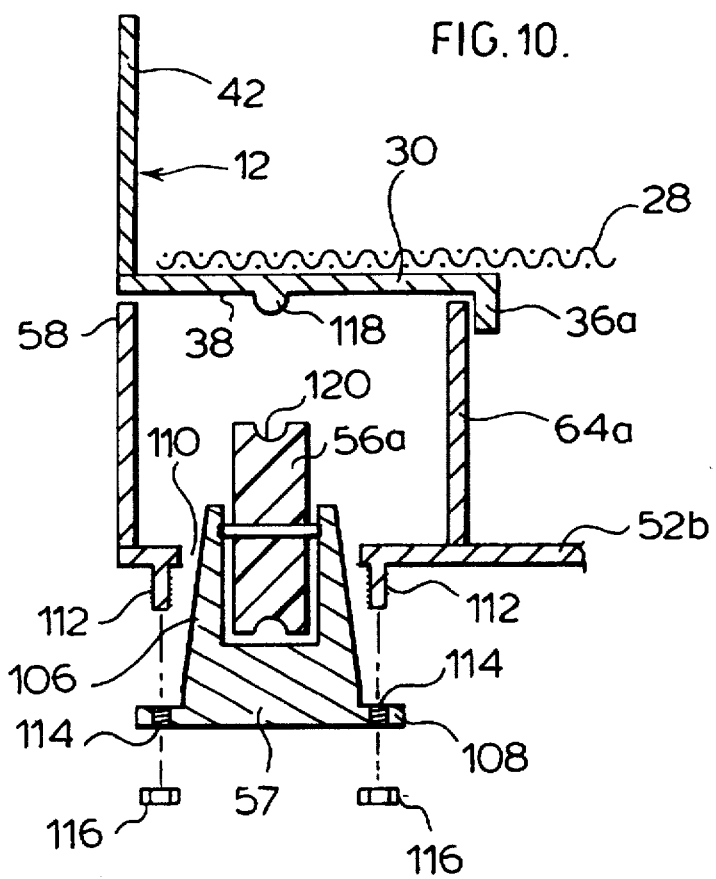
FIG. 10 shows an exploded sectional view of the supporting wheel of FIG. 9 with the wheel and wheel support partially withdrawn from the spray shield.
Figure 11:
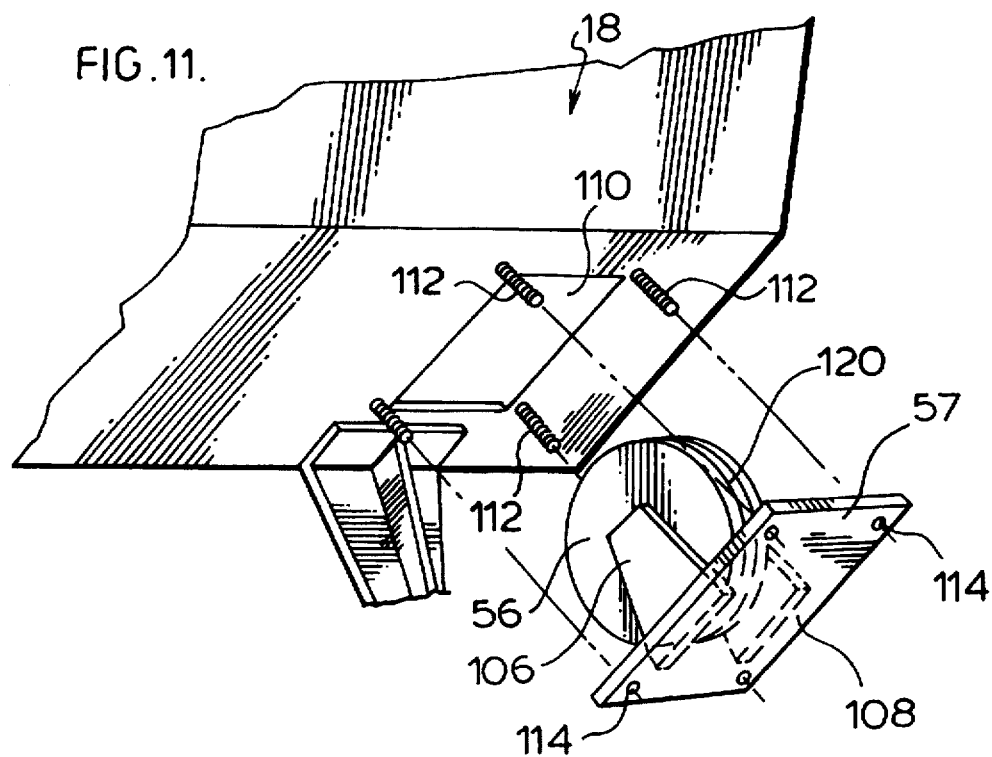
FIG. 11 shows an exploded partial perspective view of the spray shield and wheel support in accordance with the fourth embodiment of FIG. 9.

FIGS. 9 to 11 illustrate a further embodiment of the invention in which support wheels made of rubber, plastic or other flexible or elastic material are provided to rotatably support the screening cylinder, and in which like reference numerals are used to identify like components. FIGS. 9 and 10 illustrate a plastic wheel 56 and steel support 57 mounted to sidewall portion 52b adjacent the inlet end of the device 10. It is to be appreciated, however, that the remaining supporting wheels and wheel supports may also be attached in a similar manner and have a similar construction.

As seen best in FIG. 9, the wheel 56a and support 57 extend inwardly through a rectangular aperture 110 formed through the sidewall portion 52b. The support 57 includes a steel bracket 106 which extends perpendicularly from a flat rectangular steel base plate 108. The wheel 56 is rotatably mounted on the bracket 106 with the bracket 106 and wheel 56 sized to permit their insertion and removal through the aperture 110. The base 108 is sized larger than the aperture 110, so that when the wheel 56 is inserted therethrough, the peripheral edge of the base abuts against the outward facing surface of the spray shield 18 in a substantially fluid tight arrangement. Threaded bolts 112 coupled to and extending outwardly from the spray shield 18 adjacent the aperture 110 are inserted through bores 114 formed in the base 108 of the support 57, and the wheel 56 and support 57 is then held in place by attaching threaded nuts 116 over the bolts.

In the embodiment shown in FIG. 9, the end frame 30 is provided with a radially outwardly extending annular guide rib 118 in place of radial flange 36b. The guide rib 118 is received in a complementary sized slot 120 formed in the peripheral surface of the wheel 56a.

The applicant has appreciated that the construction shown in FIGS. 9 to 11 advantageously permits the apparatus to be used with wheels 56 formed from softer materials to thereby reduce noise, while permitting simplified replacement of worn wheels 56. In this regard, when a supporting wheel 56 needs replacement, one only has to unfasten the threaded nuts 116 and remove the entire wheel support 57 and wheel 56 from the casing 14. As shown in FIG. 10, as the support 57 and wheel 56 is removed, the screening cylinder 12 moves under gravity to a position resting upon the end frame member 58 (and/or end frame member 60 not shown) and bulkhead 64a (and/or bulkhead 64b not shown). By the cylinder 12 coming to rest on the radially inwardly projecting portions of the spray shield 18, the need to remove the cylinder or use unwieldy jacks may be avoided. On replacement of the wheel 56, the new wheel and bracket 106 of the wheel support 57 are then reinserted into the aperture 110 so that the guide rib 118 locates within slot 120 and each bolt 112 extends through a corresponding bore 114 in the base 108. By tightening the threaded nuts 116 on the bolts 112, the wheel support 57, and thereby the wheel 56, is moved radially inwardly, so that the wheel 56 engages and lifts the cylinder 12 a desired distance off of the end wall 58 and bulkhead 64.

It is to be appreciated that the foregoing construction also advantageously permits adjustment in the positioning of the cylinder 12 relative to the spray shield 18. By employing spacers (not shown) such as washers or the like over the bolts 112, the spacing between the end frame member 30 and the end wall 58 and bulkhead 64a may be controlled. In addition, the use of spacers also permits the positioning of the wheel 56a to be moved inwardly to compensate for any wear, and provide longer part life.

The applicant has discovered that use of a guide rib 118 and slot 120 advantageously act to limit axial movement of the cylinder 12 as it is rotated. While FIG. 9 shows the use of a guide rib 118 having a semi-circular profile, extending annularly about the end frame member 30 guide ribs having different shaped profiles are also possible.

While FIGS. 9 and 10 illustrate the guide rib 118 as extending radially outwardly from the end frame member 30, it is to be appreciated that the guide rib could alternately be provided on the end frame member 32, as well as on both end frame members 30,32 and with complementary slots 120 formed in associated supporting wheels 56.

The preferred embodiment of the invention discloses the present apparatus for use in increase in the solid content of wood pulp. The screening apparatus is equally suitable for other uses including, for example, increase in the solid content of sewage, sludge and/or food processing.

Although the detailed description describes preferred embodiments of the invention, the invention is not so limited and many modifications and variations will now occur to persons skilled in this art. For a definition of the invention, reference may be had to the appended claims.

I claim:

1. A rotary screening apparatus for increasing the solid content of influent, said apparatus comprising,
    a hollow cylinder having a central longitudinal axis oriented at approximately 0° to 45° from horizontal, the cylinder being journalled for rotation about the axis and including an inlet end, an outlet end, and a generally cylindrical wall comprising a screening surface,
    conveying means for delivering said influent into the interior of the cylinder via said inlet end,
    roller means for rotatably supporting said cylinder,
    rotation means for rotating said cylinder about the axis,
    casing means for housing said cylinder, the casing means including lower shield means for containing filtrate from said influent which passes downwardly through said cylindrical wall,
    the shield means including lower sidewall means extending from said inlet end to said outlet end, the lower sidewall means comprising a lower pan member spaced below said cylinder and edge sidewall portions extending upwardly from opposite sides of the pan member about a portion of said cylinder wall, said pan member and sidewall portions being integrally formed from a unitary sheet of metal, and
    wherein said roller means comprises a pair of spaced apart wheels mounted to said edge sidewall portions.

2. An apparatus as claimed in claim 1 wherein the casing means further including cover means for covering said cylinder, the cover means sized for complementary placement over said shield means and cylinder, and including upper sidewall means extending from said inlet end to said outlet end.

3. An apparatus as claimed in claim 2 wherein said upper sidewall means includes an uppermost top portion and cover edge sidewall portions extending downwardly from opposite sides of the top portion so that said cover means and said shield means substantially encircle said cylindrical wall, the top portion and the cover sidewall portions being integrally formed from a unitary sheet of metal.

4. An apparatus as claimed in claim 2 wherein said cover means is hingely coupled to said shield means, said cover means being movable between an open position which permits access to said cylinder and a closed position preventing said access.

5. An apparatus as claimed in claim 1 wherein said shield means further includes first bulk head means for reinforcing said lower sidewall means.

6. An apparatus as claimed in claim 5 wherein said cylinder includes inlet end covering means for covering said inlet end, said inlet end covering means extending radially inwardly from said cylindrical wall towards said axis and defining an inlet opening into the interior of said cylinder spaced towards said axis,
    said conveying means delivering said influent into said cylinder via the inlet opening.

7. An apparatus as claimed in claim 6 wherein said shield means further including first end wall means coupled to the lower sidewall means adjacent the inlet end of the cylinder, the first end wall means further including header box means for providing support for said conveying means thereon.

8. A rotary screening apparatus for increasing the solid content of influent, said apparatus comprising,
    a hollow cylinder having a central axis oriented at approximately 0° to 10° from horizontal, the cylinder being journalled for rotation about said axis and including an inlet end, an outlet end and a cylindrical wall comprising a screening surface and a generally cylindrical end frame member spaced towards each of a respective one of said inlet end and said outlet end,
    a plurality of roller means for engaging each said end frame members to rotatably support said cylinder,
    conveying means for delivering said influent into the interior of said cylinder via the inlet end,
    casing means for housing the cylinder, the casing means including shield means for containing filtrate from said influent which passes through said cylindrical wall,
    the shield means including sidewall means extending substantially from said inlet end to said outlet end and first and second bulkhead means for reinforcing said sidewall means, the sidewall means comprising an integral sheet of metal extending about a lower portion of said cylindrical wall, each of said first and second bulkhead means being secured to said sidewall means towards said inlet end and said outlet end and extending towards said end frame member spaced towards said inlet end and said outlet end respectively so as to restrict movement of said filtrate therebetween, and wherein each of said roller means comprises a pair of spaced apart wheels mounted to said sidewall means.

9. An apparatus as claimed in claim 8 further including cover means for placement over said shield means, the cover means having a size selected so that when placed over the shield means the cover means and the shield means substantially encircle the cylinder wall.

10. An apparatus as claimed in claim 9 wherein said cover means is hingely coupled to said shield means, said cover means movable between an open position which permits access to said cylinder and a closed position preventing said access.

11. An apparatus as claimed in claim 9 wherein said cover means includes top sidewalls formed from a unitary sheet of bent metal.

12. An apparatus as claimed in claim 8 wherein said cylinder includes inlet end covering means for covering said inlet end, said inlet end covering means extending radially inwardly from said cylindrical wall towards said axis and defining an inlet opening into the interior of said cylinder spaced towards said axis, said conveying means delivering said influent into said cylinder via the inlet opening.

13. An apparatus as claimed in claim 12 wherein said shield means further including first end wall means coupled to the lower sidewall means adjacent the inlet end of the cylinder, the first end wall means further including header box means for providing support for said conveying means thereon.

14. An apparatus as claimed in claim 8 wherein each of said first and second bulkhead means includes drain means for permitting movement of said filtrate therepast.

15. An apparatus as claimed in claim 8 wherein each of said end frame members includes radially extending flange means for mated positioning with a corresponding one of said first and second bulkhead means.

16. A rotary screening apparatus for increasing the solid content of influent, said apparatus comprising, a hollow cylinder having a central axis oriented at approximately 0° to 10° horizontally, the cylinder being journalled for rotation about said axis and including an inlet end, an outlet end and a cylindrical wall comprising a screening surface and first and second generally cylindrical end frame members spaced towards said inlet end and said outlet end respectively, a plurality of roller means for engaging each said end frame members to rotatably support said cylinder, conveying means for delivering said influent into the interior of said cylinder via the inlet end, casing means for housing the cylinder, the casing means including shield means for containing filtrate from said influent which passes through said cylindrical wall, the shield means including sidewall means extending substantially from said inlet end to said outlet end, bulkhead means coupled to said sidewall means for reinforcing said casing means, and end wall means secured at each end of the sidewall means, the sidewall means comprising a lower pan member spaced below and cylinder and edge sidewall portions extending upwardly from opposite sides of the pan member about a portion of said cylinder wall, the sidewall means having a plurality of apertures therethrough, wherein each of said roller means being removably insertable through a respective one of said apertures to a position engaging said end frame members.

17. A rotary screening apparatus for increasing the solid content of influent, said apparatus comprising, a hollow cylinder having a central longitudinal axis oriented at approximately 0° to 45° from horizontal, the cylinder being journalled for rotation about the axis and including an inlet end, an outlet end, and a generally cylindrical wall comprising a screening surface, conveying means for delivering said influent into the interior of the cylinder via said inlet end, roller means for rotatably supporting said cylinder, rotation means for rotating said cylinder about the axis, casing means for housing said cylinder, the casing means including lower shield means for containing filtrate from said influent which passes downwardly through said cylindrical wall, the shield means including lower sidewall means extending from said inlet end to said outlet end and first bulk head means for reinforcing said lower sidewall means, the lower sidewall means comprising a lower pan member spaced below said cylinder and edge sidewall portions extending upwardly from opposite sides of the pan member about a portion of said cylinder wall, said pan member and sidewall portions being integrally formed, said cylinder wall further comprising a first cylindrical end frame member disposed towards said inlet end, said first end frame member comprising an annular radially outwardly facing track means, said roller means comprises first and second pairs of drive wheels, said first pair of drive wheels rotatably engaging said first end member track means, the first bulkhead means located adjacent said inlet end between said first pair of drive wheels and said outlet end, and extending from said lower sidewall means towards said cylinder wall a distance selected to substantially prevent the movement of filtrate therebetween.

18. A rotary screening apparatus for increasing the solid content of influent, said apparatus comprising, a hollow cylinder having a central axis oriented at approximately 0° to 10° from horizontal, the cylinder being journalled for rotation about said axis and including an inlet end, an outlet end and a cylindrical wall comprising a screening surface and a generally cylindrical end frame member spaced towards each of a respective one of said inlet end and said outlet end, a plurality of roller means for engaging each said end frame members to rotatably support said cylinder, conveying means for delivering said influent into the interior of said cylinder via the inlet end, casing means for housing the cylinder, the casing means including shield means for containing filtrate from said influent which passes through said cylindrical wall, the shield means including sidewall means extending substantially from said inlet end to said outlet end and first and second bulkhead means for reinforcing said sidewall means, the sidewall means comprising an integral sheet of metal extending about a lower portion of said cylindrical wall, each of said first and second bulkhead means being secured to said sidewall means towards said inlet end and said outlet end and extending towards said end frame member spaced towards said inlet end and said outlet end respectively so as to restrict movement of said filtrate therebetween, wherein said shield means includes a first pair of apertures formed through said sidewall means intermediate the inlet end of said cylinder and said first bulkhead means, and a second pair of apertures formed through said sidewall means intermediate the outlet end of the cylinder and the second bulkhead means, the roller means including first and second pairs of roller wheels, each of the first pair of roller wheels sized for removable insertion through a respective one of said first pair of apertures to engagingly support a peripheral edge of a first one of said end frame members, and each of the second pair of roller wheels sized for removable insertion through a respective one of said second pair of apertures to engagingly support a peripheral edge of a second one of said frame members.

19. An apparatus as claimed in claim 18 wherein said first one of said frame members includes a radially outwardly extending annular guide rib, and a peripheral edge portion of said each of said first pair of roller wheels including a guide groove having a complementary size to said guide rib, wherein when each of said first pair of wheels are inserted through said respective one of said first pair of apertures, said guide rib locates in a portion of the guide groove of each of said first pair of roller wheels.

20. A rotary screening apparatus for increasing the solid content of influent, said apparatus comprising, a hollow cylinder having a central longitudinal axis oriented at approximately 0° to 45° from horizontal, the cylinder being journalled for rotation about the axis and including an inlet end, an outlet end, and a generally cylindrical wall comprising a screening surface, conveying means for delivering said influent into the interior of the cylinder via said inlet end, roller means for rotatably supporting said cylinder, rotation means for rotating said cylinder about the axis, casing means for housing said cylinder, the casing means including lower shield means for containing filtrate from said influent which passes downwardly through said cylindrical wall, the shield means including lower sidewall means extending from said inlet end to said outlet end, the lower sidewall means comprising a lower pan member spaced below said cylinder and edge sidewall portions extending upwardly from opposite sides of the pan member about a portion of said cylinder wall, said pan member and sidewall portions being integrally formed, and wherein said shield means includes a plurality of apertures formed through said sidewall portions, said roller means including a plurality of wheel means, each of said wheel means sized for removable insertion through a respective one of said apertures to engage and rotatably engagingly support a peripheral edge portion of said cylinder wall.

21. An apparatus as claimed in claim 20 wherein said axis inclines upwardly from the inlet end towards the outlet end at between 0 and 5 degrees from horizontal.

* * * * *